United States Patent
He et al.

(10) Patent No.: US 8,563,171 B2
(45) Date of Patent: Oct. 22, 2013

(54) ELECTRODE SLURRY IMPROVING RATE PERFORMANCE OF LITHIUM BATTERY AND ELECTRODE OF LITHIUM BATTERY

(75) Inventors: Xiang-Ming He, Beijing (CN); Wen-Jia Zhang, Beijing (CN); Wei-Hua Pu, Beijing (CN); Jian-Jun Li, Beijing (CN); Jian Gao, Beijing (CN); Chang-Yin Jiang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 291 days.

(21) Appl. No.: 12/904,700

(22) Filed: Oct. 14, 2010

(65) Prior Publication Data

US 2011/0300443 A1 Dec. 8, 2011

(30) Foreign Application Priority Data

Jun. 3, 2010 (CN) .......................... 2010 1 0191054

(51) Int. Cl.
*H01M 4/60* (2006.01)

(52) U.S. Cl.
USPC ........... 429/212; 429/215; 429/233; 429/217; 252/182.1

(58) Field of Classification Search
USPC ................ 429/212, 217, 215, 232, 233, 221, 429/218.1; 252/182.1, 500
See application file for complete search history.

(56) References Cited

U.S. PATENT DOCUMENTS

| | | | | |
|---|---|---|---|---|
| 5,624,903 | A | * | 4/1997 | Muller et al. .................. 514/6.5 |
| 2006/0257738 | A1 | | 11/2006 | Kim et al. |
| 2010/0086855 | A1 | * | 4/2010 | Kohmoto et al. .......... 429/231.6 |

FOREIGN PATENT DOCUMENTS

| | | |
|---|---|---|
| CN | 101609881 | 12/2009 |
| CN | 101630731 | 1/2010 |

\* cited by examiner

*Primary Examiner* — Raymond Alejandro
(74) *Attorney, Agent, or Firm* — Altis & Wispro Law Group, Inc.

(57) ABSTRACT

An electrode slurry which includes an active component, a conductive agent, a binder, an organic solvent, and octylphenolpoly(ethyleneglycolether)$_x$, wherein x=9~10. The active component, conductive agent, binder, organic solvent, and octylphenolpoly(ethyleneglycolether)$_x$ are mixed together. An electrode of lithium battery includes a current collector, and a layer of electrode material applied on a surface of the current collector, wherein a material of the layer of electrode material comprises an active component, a conductive agent, a binder, and octylphenolpoly(ethyleneglycolether)$_x$, wherein x=9~10.

10 Claims, 7 Drawing Sheets

ELECTRODE SLURRY IMPROVING RATE PERFORMANCE OF LITHIUM BATTERY AND ELECTRODE OF LITHIUM BATTERY

CROSS-REFERENCE TO RELATED APPLICATIONS

This application claims all benefits accruing under 35 U.S.C. §119 from China Patent Application No. 201010191054.2, filed on Jun. 3, 2010 in the China Intellectual Property Office, the contents of which are hereby incorporated by reference.

BACKGROUND

1. Technical Field

The present disclosure relates to electrode slurries and electrodes and, particularly, to electrode slurries of lithium batteries and electrodes of lithium batteries.

2. Description of Related Art

A lithium battery includes a negative electrode (i.e., anode), a positive electrode (i.e., cathode), a separator located between the anode and the cathode, and an electrolyte solution soaking the anode, the cathode and the separator. In order to form a cathode, cathode slurry including a lithium-transition metal oxide as a cathode active material, carbon black as a conductive agent, polyvinylidene fluoride (PVDF), or styrene-butadiene rubber (SBR) as a binder and N-methyl-2-pyrrolidone (NMP) as a solvent is prepared. The cathode slurry is coated on a collector made of a metal foil, and then drying, pressing, and molding steps are performed. In order to form an anode, the same method as described above is performed, except that the anode slurry includes carbon or carbon composite capable of lithium ion intercalation/deintercalation as an anode active material, PVDF or SBR as a binder and NMP as a solvent are used. The slurry plays an important role to the manufacturing process of the electrodes, and performance of the electrodes and lithium batteries.

However, although the slurries include the same components, the performance of the lithium batteries using them may be different. For example, if the sequence of adding the components is different, the rate performance of the lithium batteries may be different. This may be caused by nonuniform dispersion of the conductive agent in the slurry. To resolve this problem, a polymer type dispersant agent may be added into the slurry. The polymer type dispersant agent may include a polymer backbone capable of surface-adsorption and a side-chain having non-ionic surfactant properties. However, the polymer type dispersant agent may have a greater effect on the slurry using water based solvent than the slurry using oil based solvent such as NMP, caused by its own dispersing problem and high viscosity.

What is needed, therefore, is to provide an electrode slurry using oil based solvent having good performance to the electrode, and the electrode formed from the slurry.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
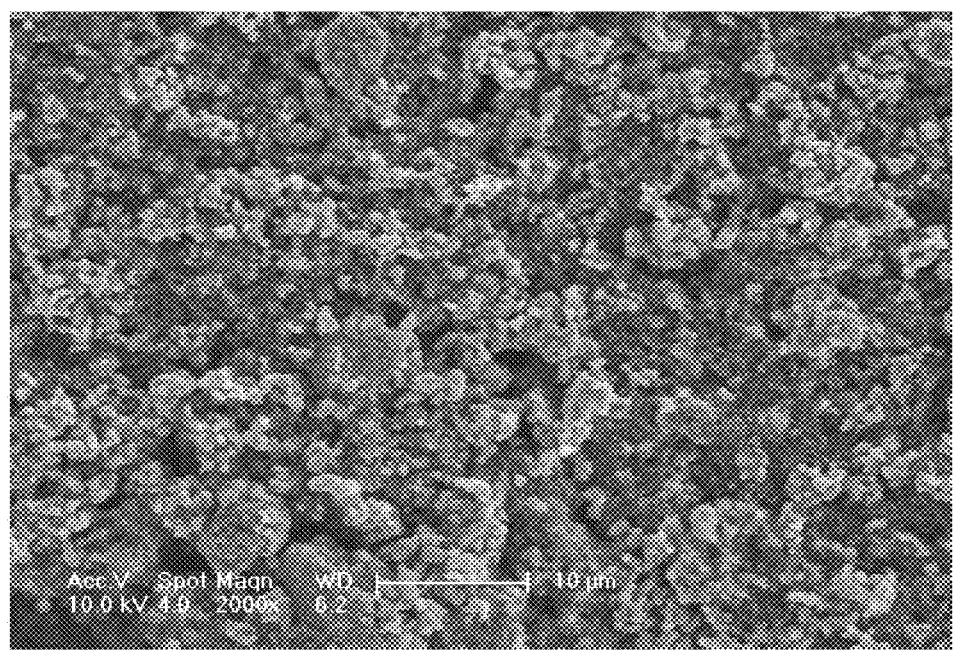
FIG. 1 is a photo showing a low resolution Scanning Electron Microscope (SEM) image of an electrode formed by an electrode slurry including Triton X-100®.
Figure 2:
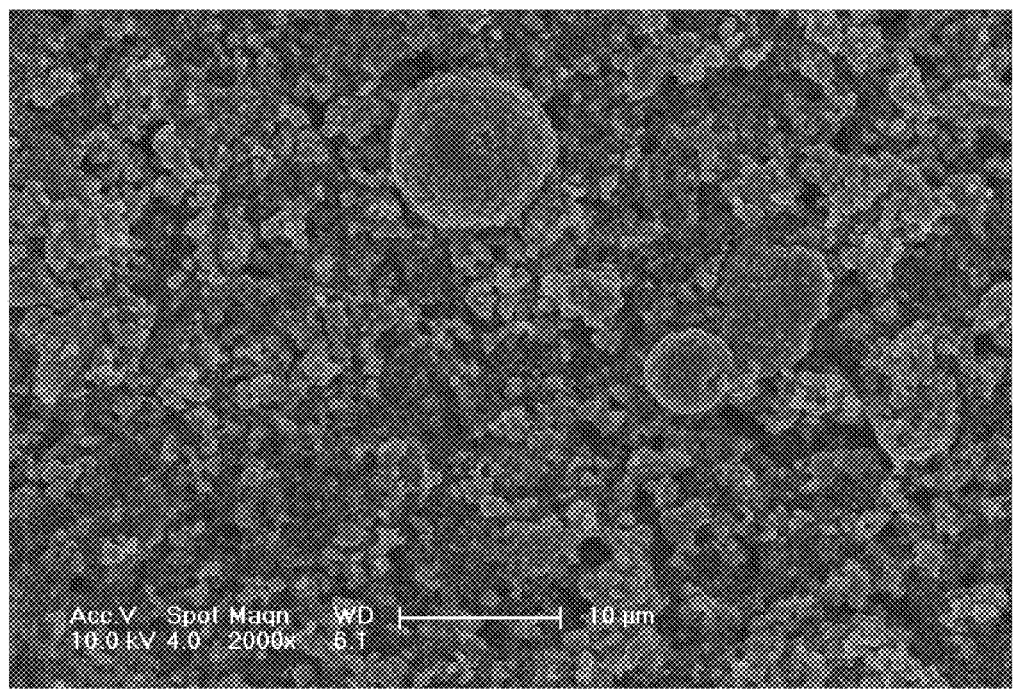
FIG. 2 is a photo showing a low resolution SEM image of an electrode without Triton X-100®.
Figure 3:
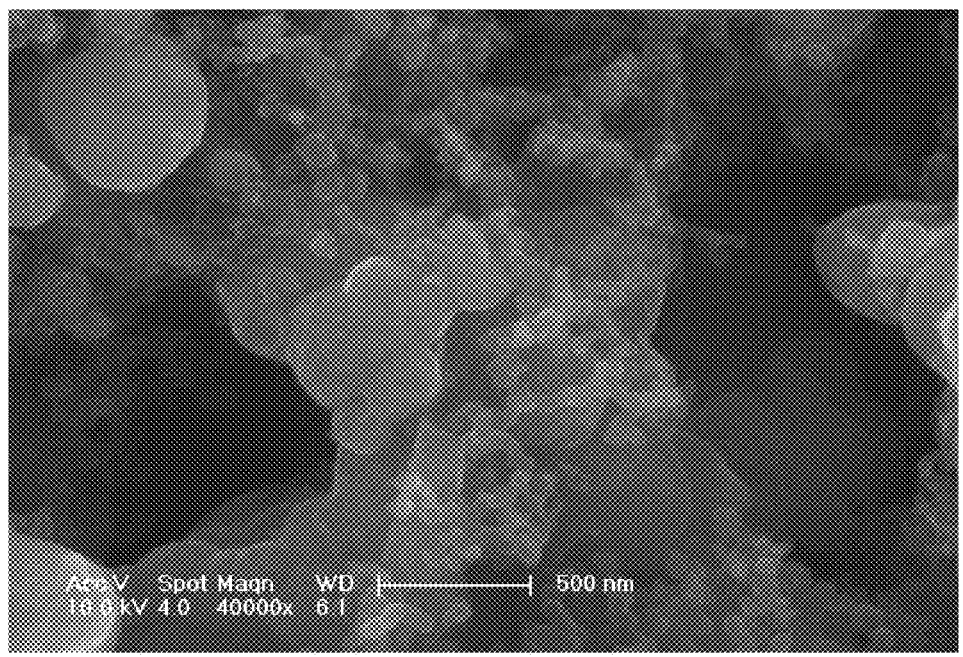
FIG. 3 is a photo showing a high resolution SEM image of the electrode of FIG. 1.
Figure 4:
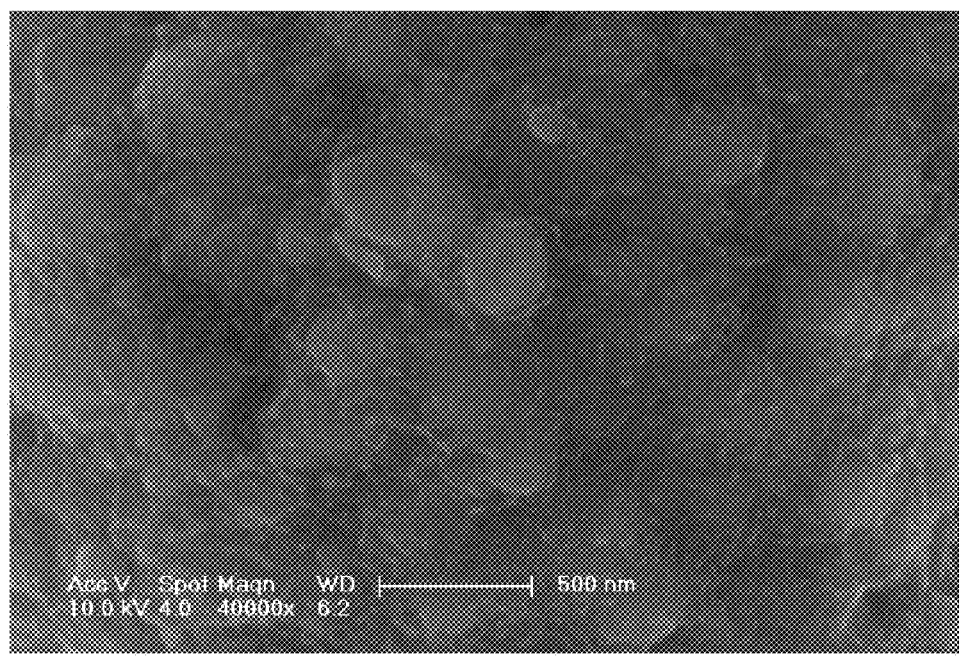
FIG. 4 is a photo showing a high resolution SEM image of the electrode of FIG. 2.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

One embodiment of an electrode slurry includes an active component, a conductive agent, a binder, an organic solvent, and octylphenolpoly(ethyleneglycolether)$_x$, x=9-10, which is also called Triton X-100®.

The active component can either be a cathode active material or an anode active material. The cathode active material can be a lithium transition metal oxide such as olivine type lithium iron phosphate (e.g. $LiFePO_4$), spinel type lithium manganese oxide (e.g. $LiMn_2O_4$), layered type lithium cobalt oxide (e.g. $LiCoO_2$), and layered type lithium nickel oxide (e.g., $LiNiO_2$). The anode active material can be a carbonaceous material such as graphite and mesocarbon microbeads (MCMB). The conductive agent can be graphite, acetylene carbon black, and/or carbon nanotubes. The organic solvent can be at least one of N-methyl pyrrolidone (NMP), N,N-dimethylformamide (DMF), N,N-diethylformamide (DEF), dimethyl sulfoxide (DMSO), tetrahydrofuran, and low alcohol. The binder can be a cross linked polymer such as PVDF, SBR, and polytetrafluoroethylene (PTFE).

In the electrode slurry, a mass ratio of a total mass of the active component, the conductive agent, and the binder to a mass of the organic solvent can be in a range from about 3:1 to about 4:1, to achieve a good rheological characteristic of the slurry, and good for the dispersion of the active component and the conductive agent in the slurry.

In the total amount of the active component, the conductive agent, and the binder, the weight percentage of the active component may be in a range from about 75% to about 90% (e.g, 80%), the conductive agent may be in a range from about 5% to about 15% (e.g, 10%), and the binder may be in a range from about 5% to about 15% (e.g., 10%).

In one embodiment, an average molecular weight of the Triton X-100® is about 647. The Triton X-100® takes about 0.25% to about 1.25% of the total mass of the electrode slurry. In one embodiment, the mass percentage of the Triton X-100® in the electrode slurry is about 0.5%.

The electrode slurry can be prepared by a method including steps of: providing an active component, a conductive agent, a binder, an organic solvent, and Triton X-100®; and mixing the active component, the conductive agent, the binder, the organic solvent, and the Triton X-100® together.

The Triton X-100® may be firstly dissolved in the organic solvent, and then the active component, the conductive agent, and the binder may be added into the organic solvent with the Triton X-100® dissolved therein. The performance of the electrode slurry and the lithium battery is not affected by the sequence of adding the active component, the conductive agent, and the binder. By using the Triton X-100® as a dispersant agent, the conductive agent can be uniformly dispersed among the active component, regardless of the order of adding the active component, the conductive agent, and the binder, processed into the organic solvent.

The conventional dispersant agent, which may be not used in the electrode slurry of the lithium battery, often has an average molecular weight in a range from about 10,000 to about 30,000, and thus has a high viscosity inducing a difficult dispersion. The high viscosity of the dispersant agent may greatly increase the viscosity of the slurry. Therefore, the conventional dispersant agent has less effect on the performance of the slurry using the oil based solvent. However, the Triton X-100® which has a relatively low molecular weight can be easily dispersed in the organic solvent. Adding a small percentage of the Triton X-100® rarely affects the viscosity of the slurry. Therefore, the performance of the electrode slurry containing Triton X-100® with the oil based solvent can be improved. Further, the components of the slurry can be mixed well by ball-milling, ultrasonic agitation, grinding, or even mechanically stirring, to disperse the conductive agent and the active component uniformly in the slurry.

One embodiment of an electrode formed from the electrode slurry, includes a current collector, and a layer of electrode material applied on a surface of the current collector. The current collector plays a role of drawing a current generated in the interior electrode material and transmitting the current to an electrode terminal. The current collector can be a metal film, foil, mesh, or plate. In one embodiment, the material of the current collector for anode electrode can be copper, and the material of the current collector for cathode electrode can be aluminum. The layer of electrode material is formed by drying the slurry to remove the organic solvent, and includes the active component, the conductive agent, the binder, and the Triton X-100®. A weight percentage of the Triton X-100® to the total weight of the electrode material may be in a range from about 1% to about 5%. In one embodiment, the weight percentage of Triton X-100® is about 2%. The electrode can have a laminar shape and a uniform thickness, which may be in a range from about 50 microns to about 300 microns. The electrode can be made by a method including steps of: providing a current collector; applying the electrode slurry to a surface of the current collector; and drying the electrode slurry at a temperature below about 120° C. The organic solvent in the electrode slurry can be completely removed by the drying step. The Triton X-100® does not decompose or evaporate below 120° C. Therefore, it remains in the electrode material. The remaining Triton X-100® in the electrode material is not a disadvantage to the performance of the lithium battery, because the addition of the Triton X-100® can effectively promote the dispersion of the active component and the conductive agent, thereby increasing the rate performance of the lithium battery.

Example

In one example, an anode electrode slurry containing Triton X-100® and an electrode formed by the slurry have been formed and compared to an electrode without the Triton X-100®.

First, the Triton X-100® was dissolved in NMP, and a Triton X-100®/NMP solution containing about 1 wt % of Triton X-100® was formed. PVDF was dissolved in NMP, and a PVDF/NMP solution containing about 10 wt % of PVDF was formed. About 1.6 g of $LiFePO_4$, about 0.2 g of acetylene carbon black, and about 2 g of the PVDF/NMP solution were then added to about 4.2 g of the Triton X-100®/NMP solution, and mechanically stirred to form the electrode slurry. The slurry was applied to the surface of an aluminum foil and dried at about 100° C., to achieve the anode electrode.

Comparing Example

The preparation method of the anode electrode without the Triton X-100® is the same as the method of the above described example, except that about 1.6 g of $LiFePO_4$, about 0.2 g of acetylene carbon black, and about 2 g of the PVDF/NMP solution are added to about 4.2 g of the NMP without the Triton X-100®.

Figure 5:
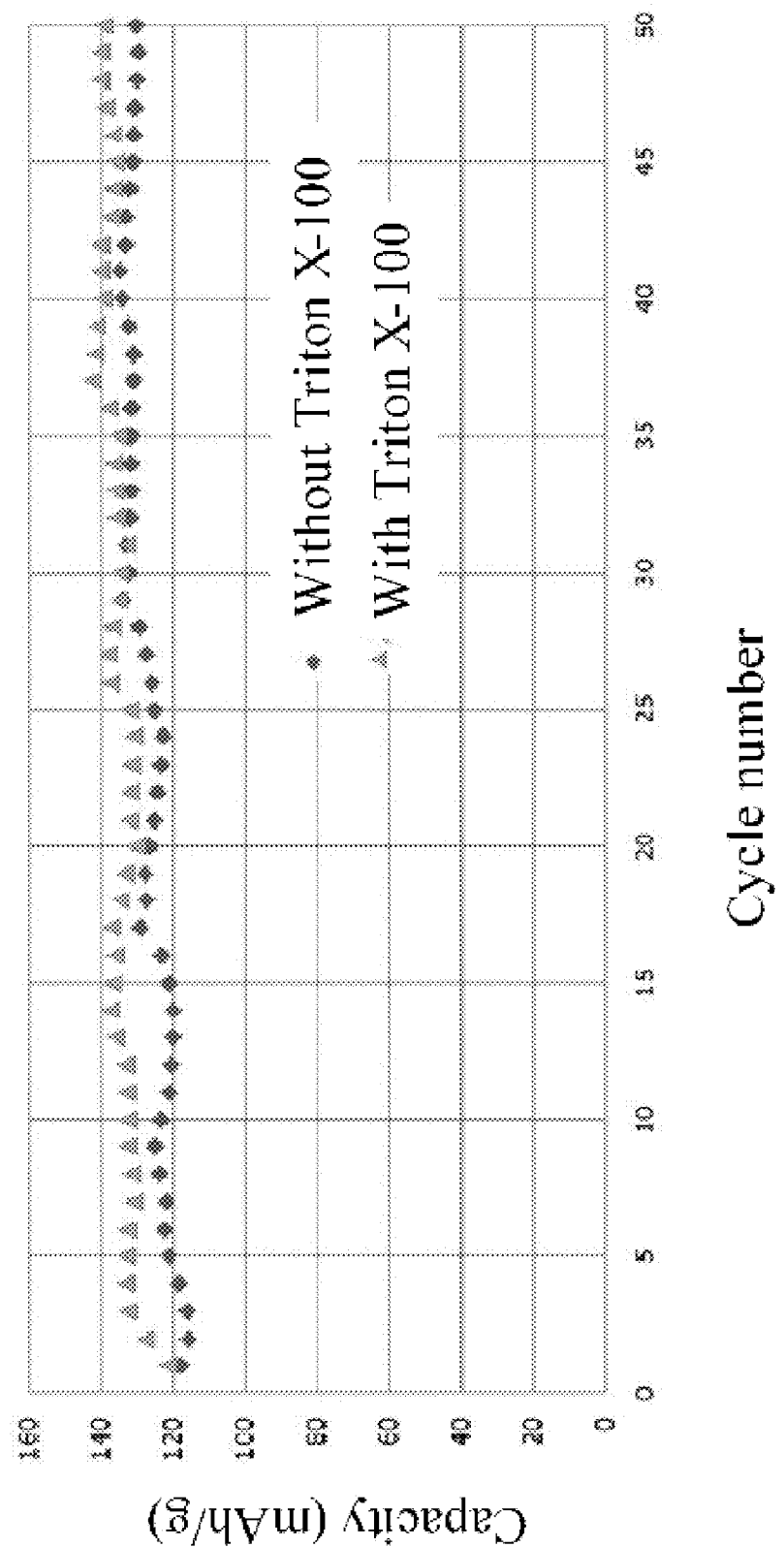
FIG. 5 is a graph comparing cycle performance testing results of lithium batteries using the electrode including Triton X-100® and the electrode without Triton X-100® at 1 C rate.
Figure 6:
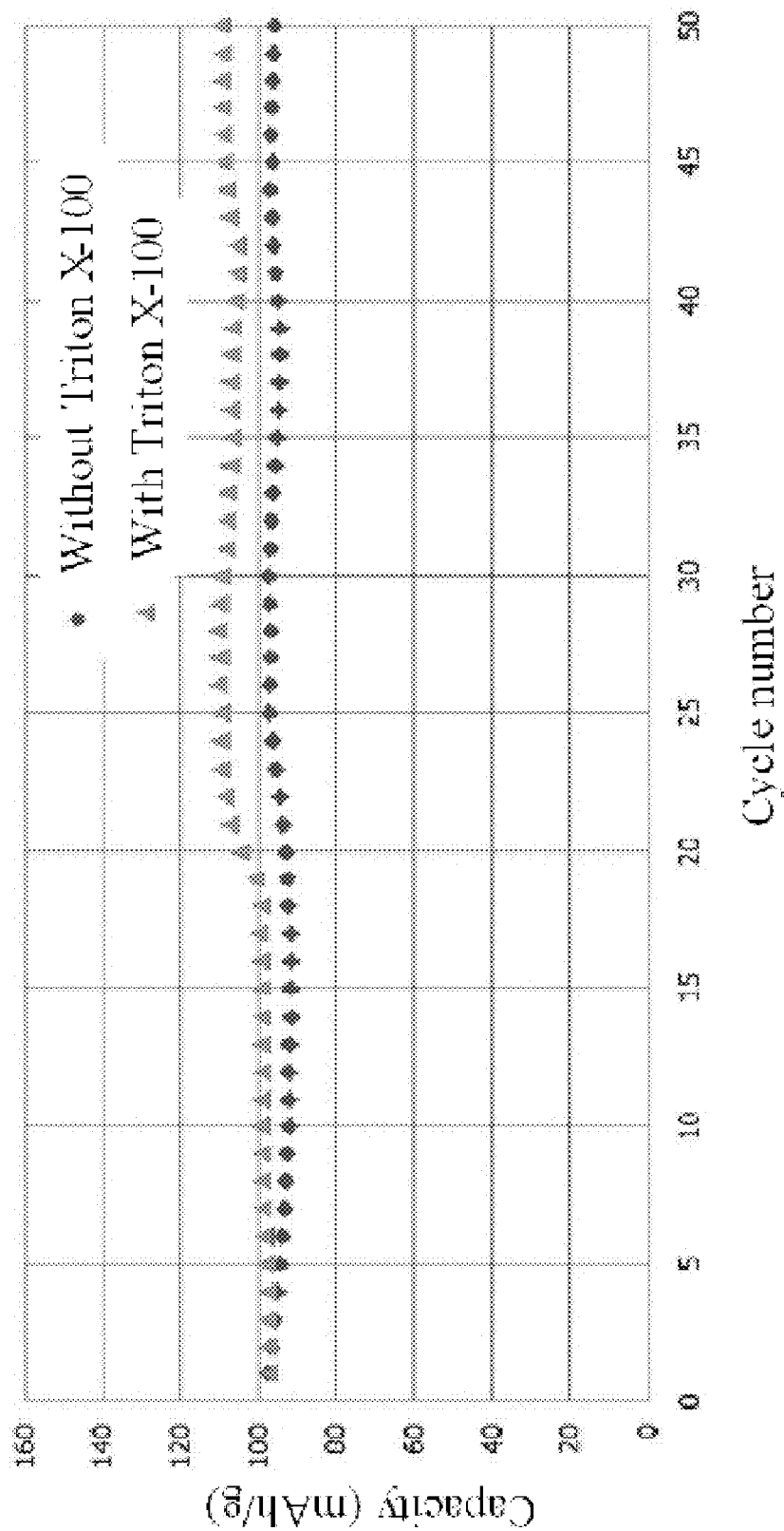
FIG. 6 is a graph comparing cycle performance testing results of lithium batteries using the electrode including Triton X-100® and the electrode without Triton X-100® at 3 C rate.
Figure 7:
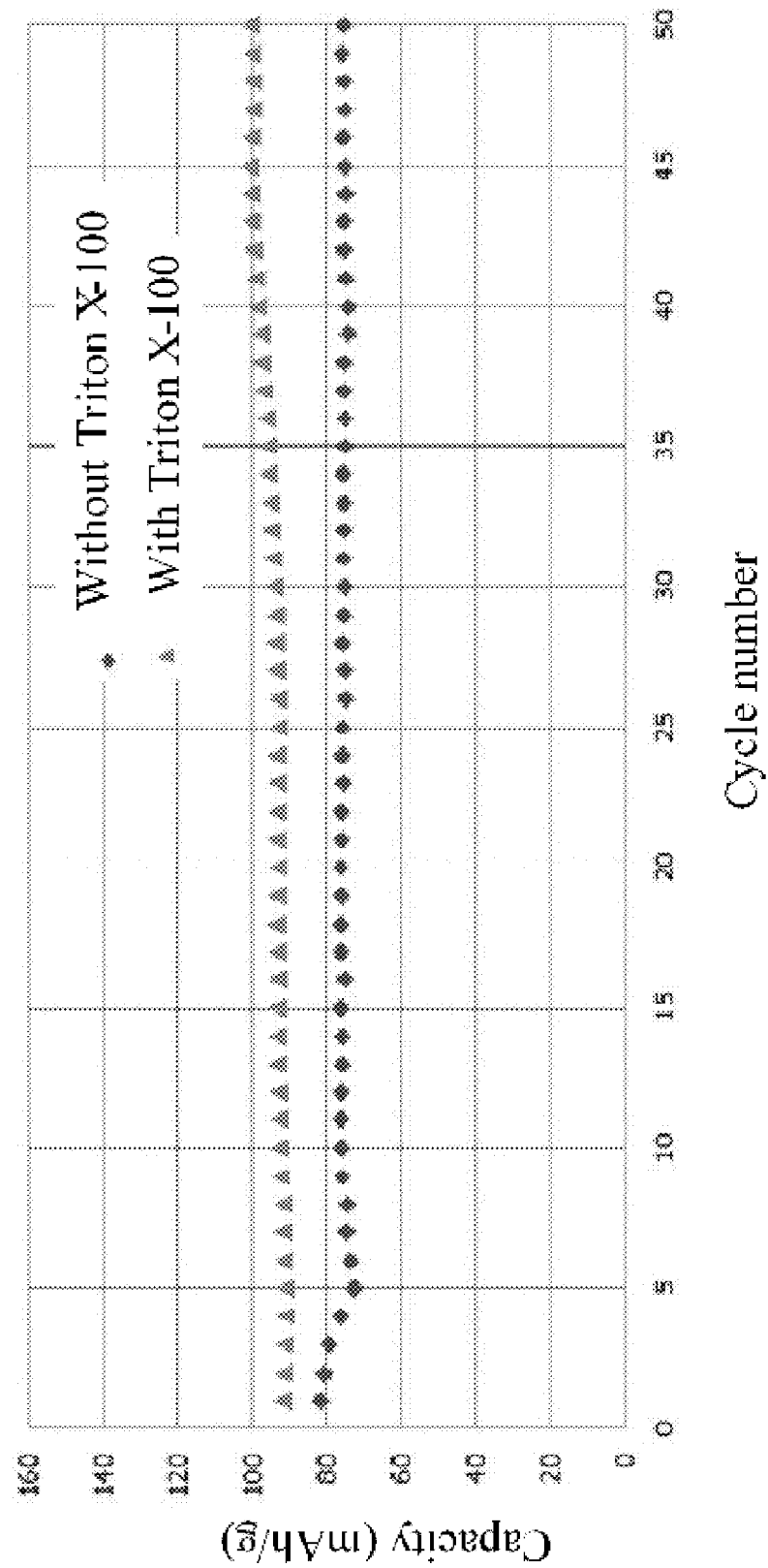
FIG. 7 is a graph comparing cycle performance testing results of lithium batteries using the electrode including Triton X-100® and the electrode without Triton X-100® at 5 C rate.

The two anode electrodes are shown by SEM images in FIGS. 1-4, and in lithium batteries in FIGS. 5-7.

Referring to FIGS. 1-4, there are an amount of acetylene carbon black small particles located around the $LiFePO_4$ large particles in the anode electrode using the Triton X-100® as the dispersant agent. However, in the anode electrode without the Triton X-100®, the $LiFePO_4$ large particles are aggregated together, but not mixed uniformly with the acetylene carbon black small particles.

The lithium batteries are prepared in the same conditions, including the same metal lithium foil as the cathode electrode, the same solution of $LiPF_6$ in the mixture of EC, DMC and DEC (1:1:1, v/v/v) as the electrolyte solution, and the same polypropylene/polyethylene porous film as the separator, and separately using the two anode electrodes. The lithium batteries are cycled at different C-rates: 1 C (i.e., 0.6 mA/cm$^2$), 3 C (i.e., 1.8 mA/cm$_2$), and 5 C (i.e., 3.0 mA/cm$_2$). Referring to FIGS. 5-7, the lithium batteries do not show an apparent difference under the small C-rate. However, as the C-rate increases, the capacity retention of the lithium battery using the Triton X-100® in the slurry is much higher than the capacity retention of the lithium battery without the Triton X-100®. Thus, the addition of the Triton X-100® in the slurry can increase the rate performance of the lithium battery.

By using the Triton X-100® as the dispersant agent in the electrode slurry, the dispersion performance of the slurry and the rate performance of the lithium battery can be improved, while the viscosity of the slurry does not need to be further adjusted.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. An electrode slurry of a lithium battery, comprising an active component, a conductive agent, a binder, an organic solvent, and octylphenolpoly(ethyleneglycolether)$_x$, mixed in a slurry form, wherein x=9~10, and wherein a mass percentage of the octylphenolpoly(ethyleneglycolether)$_x$ in the electrode slurry is in a range from about 0.25% to about 1.25%.

2. The electrode slurry of claim 1, wherein the organic solvent is selected from the group consisting of N-methyl pyrrolidone, N,N-dimethylformamide, N,N-diethylformamide, dimethyl sulfoxide, tetrahydrofuran, and low alcohol.

3. The electrode slurry of claim 1, wherein the active component is a cathode active material or an anode active material.

4. The electrode slurry of claim 1, wherein a mass ratio of a total mass of the active component, the conductive agent, and the binder to a mass of the organic solvent is in a range from about 3:1 to about 4:1.

5. The electrode slurry of claim 1, wherein a mass percentage of the octylphenolpoly(ethyleneglycolether)$_x$ in the electrode slurry is about 0.5%, wherein x=9~10.

6. An electrode of lithium battery, comprising a current collector, and a layer of electrode material applied on a surface of the current collector, wherein a material of the layer of electrode material comprises an active component, a conductive agent, a binder, and octylphenolpoly(ethyleneglycolether)$_x$, wherein x=9~10, and wherein a mass percentage of the octylphenolpoly(ethyleneglycolether)$_x$ in the electrode material is in a range from about 1% to about 5%.

7. The electrode of claim 6, wherein a mass percentage of the octylphenolpoly(ethyleneglycolether)$_x$ in the electrode material is about 2%, wherein x=9~10.

8. The electrode of claim 6, wherein the active component is a cathode active material.

9. The electrode of claim 8, wherein the cathode active material is LiFePO$_4$.

10. The electrode of claim 6, wherein a material of the current collector is copper or aluminum.

* * * * *